(12) United States Patent
Feldstein et al.

(10) Patent No.: US 7,418,376 B1
(45) Date of Patent: Aug. 26, 2008

(54) METHOD FOR GENERATING A SIMULATED NETWORK BASED ON AN ACTUAL MANAGED NETWORK

(75) Inventors: Jeffrey B. Feldstein, Goleta, CA (US); Manuel Angel Diaz, Gilroy, CA (US); Tarun Raisoni, San Jose, CA (US)

(73) Assignee: Cisco Systems, Inc., San Jose, CA (US)

( * ) Notice: Subject to any disclaimer, the term of this patent is extended or adjusted under 35 U.S.C. 154(b) by 492 days.

(21) Appl. No.: 10/821,289

(22) Filed: Apr. 8, 2004

(51) Int. Cl.
*G06F 13/10* (2006.01)
(52) U.S. Cl. .......................................... 703/21; 709/223
(58) Field of Classification Search .................. 703/21; 709/223–226
See application file for complete search history.

(56) References Cited

U.S. PATENT DOCUMENTS

| | | | | |
|---|---|---|---|---|
| 5,809,282 | A * | 9/1998 | Cooper et al. | 709/226 |
| 6,014,697 | A * | 1/2000 | Lewis et al. | 709/223 |
| 6,714,217 | B2 | 3/2004 | Huang et al. | |
| 7,031,895 | B1 | 4/2006 | Takahashi et al. | 703/13 |
| 7,047,176 | B2 | 5/2006 | Klevans et al. | 703/21 |
| 2001/0033548 | A1* | 10/2001 | Saleh et al. | 370/218 |
| 2003/0212908 | A1* | 11/2003 | Piesco | 713/201 |

OTHER PUBLICATIONS

Schulte, Wolfgang. "Internetworking Technology Overview: Network Management Basics," The Berufsakademie Stuttgart, Oct. 1999, 12 pages.*

Tyan, Hung-ying. "Design, Realization and Evaluation of a Component-Based Compositional Software Architecture for Network Simulation." Doctoral Dissertation. Ohio State University 2002, 224 pages.*

Nicol, David M. "Comparison of Network Simulators Revisited." Dartmouth College 2002, pp. 1-8.*

Breslau, Lee et al. "Advances in Network Simulation." IEEE 2000, pp. 59-67.*

National Science Foundation, Wesely Eddy and Morely Mao, Network Simulators, 2 pgs., last modified:May 2004, www.icir.org/models/simulators.html.

MIMIC Simulator Suite, 2 pgs., 1996-206 Gamit Communications, Inc., www.gambitecomm.com/site/products/.

OPNET Press Release, HP and MIL 3 Deliver Decision Support for SAP Deployment with HP OpenView Service Simulator for Networks for SAP R/3 HP, Aug. 1999, 3 pages.

Riley, George, PDNS—Parallel/Distributed NS, http://www.cc.gatech.edu/computing/compass/pdns, last modified Mar. 16, 2004, 10 pages.

Manohar, R. and Kelly, C. IV, Network on a chip: modeling wireless networks with asynchronous VLS, Communication Magazine, IEEE, vol. 39, Issue 11, Nov. 2001, 12 pages.

* cited by examiner

*Primary Examiner*—Russell Frejd
(74) *Attorney, Agent, or Firm*—Stolowitz Ford Cowger LLP (57) ABSTRACT

A method for generating a simulated network. A network discovery database for a managed network is accessed, wherein the network discovery database includes device information and connectivity information for a plurality of devices of the managed network. A build file describing the simulated network is automatically generated based on the network discovery database. A user is able to create and edit a simulated network based on an actual managed network, thereby obviating the need for manually coding a simulated network.

30 Claims, 5 Drawing Sheets

| Device | Type | Operating System |
|--------|------|------------------|
| 1 | 2500 | 10.5 |
| 2 | 2500 | 12.2 |
| 3 | 3600 | 10.5 |
| 4 | 5200 | 12.3 |
| ... | ... | ... |

| Interface | Type | Up/Down | Neighbor |
|-----------|------|---------|----------|
| e0 | 10 MB | Up | 2 |
| e1 | 10 MB | Down | 1 |
| e2 | 1 GB | Up | 4 |

METHOD FOR GENERATING A SIMULATED NETWORK BASED ON AN ACTUAL MANAGED NETWORK

FIELD OF INVENTION

The present invention relates to the field of computer network simulation. Specifically, the present invention relates to a method for generating a simulated network based on an actual managed network.

BACKGROUND OF THE INVENTION

In a large enterprise with a large number of computing devices, the networking infrastructure can be extraordinarily complex. For example, a network of a large enterprise may include five to ten thousand network devices as well as thousands of end-stations or "hosts". Network management systems are typically employed to monitor the network in order to ensure that the network is functioning properly.

In order to ensure proper functioning of a network management system, it is necessary to test the network management system while connected to a network. In the past, the network management system would often be connected to a network of a live customer enterprise to conduct these tests. However, due to security and network disruption concerns, enterprises are no longer open to this sort of testing.

Currently, one way to test a network management system is to set up an actual network in a laboratory. For example, a network of ten to one hundred devices can be set up, and the network management system is used for monitoring the network. This method assumes that if the network management system works for a network of up to one hundred devices, it will work for a network of several thousand devices. However, this assumption is not always valid, as network complexity gets much greater as the number of devices increases.

Another way for testing a network management system is to connect the network management system to a simulated network. A simulated network is typically a data file and software system that is able to convince the network management system that it is connected to and monitoring an actual network. Network simulation tools exist for assisting a user in creating a simulated network. Specifically, typical network simulation tools allow a user to specify devices of the simulated network. However, it is necessary for the user to manually enter in connection information for each device. That is, a configuration file that identifies the connections between the devices must be created or edited for each device. For simulating a large network of several thousand devices this is very time consuming, thereby consuming substantial human and financial resources of the enterprise.

SUMMARY OF THE INVENTION

Various embodiments of the present invention, a method for generating a simulated network, are described herein. In one embodiment, a network discovery database for a managed network is accessed, wherein the network discovery database comprises device information and connectivity information for a plurality of devices of the managed network. A build file describing the simulated network is automatically generated based on the network discovery database. In one embodiment, the build file is for use by a network management simulator to simulate a network.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention, a method for generating a simulated network based on a managed network, are presented herein. Embodiments of the present invention provide for accessing a network discovery database for the managed network, and generating a simulated network based on the network discovery database. The simulated network is automatically generated based on the devices and the connections as described in the network discovery database.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "generating", "extracting", "determining", "selecting", "creating", or the like, refer to the actions and processes of a computer system or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
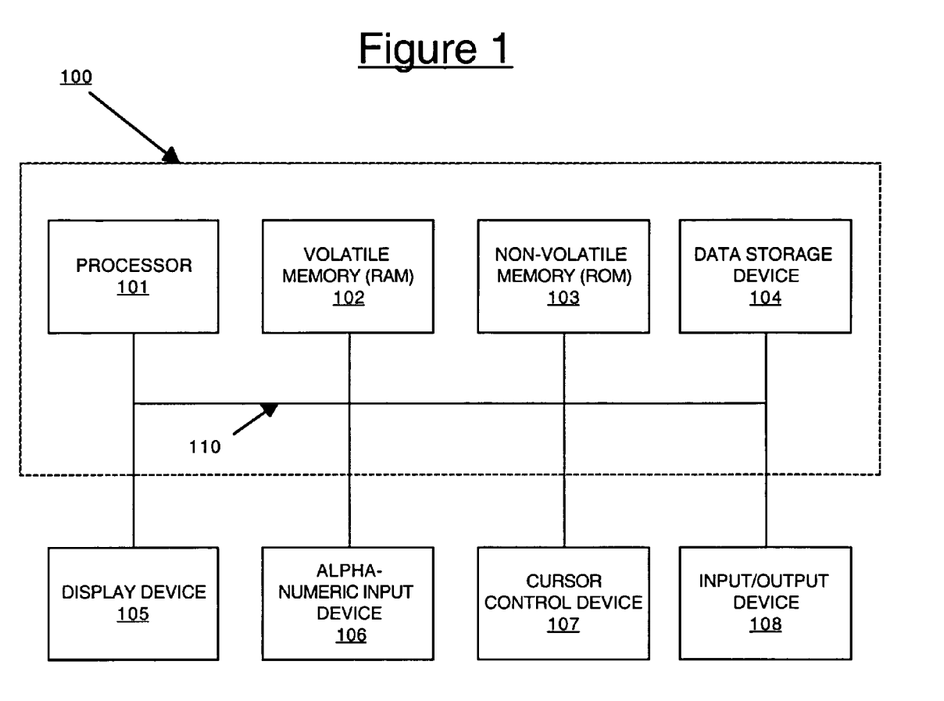
FIG. 1 is a block diagram of an exemplary computer system platform upon which embodiments of the present invention may be practiced.

Exemplary Hardware Upon which Embodiments of the Present Invention May be Implemented Refer now to FIG. 1 which illustrates an exemplary computer system 100 upon which embodiments of the present invention may be practiced. In general, computer system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions.

In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
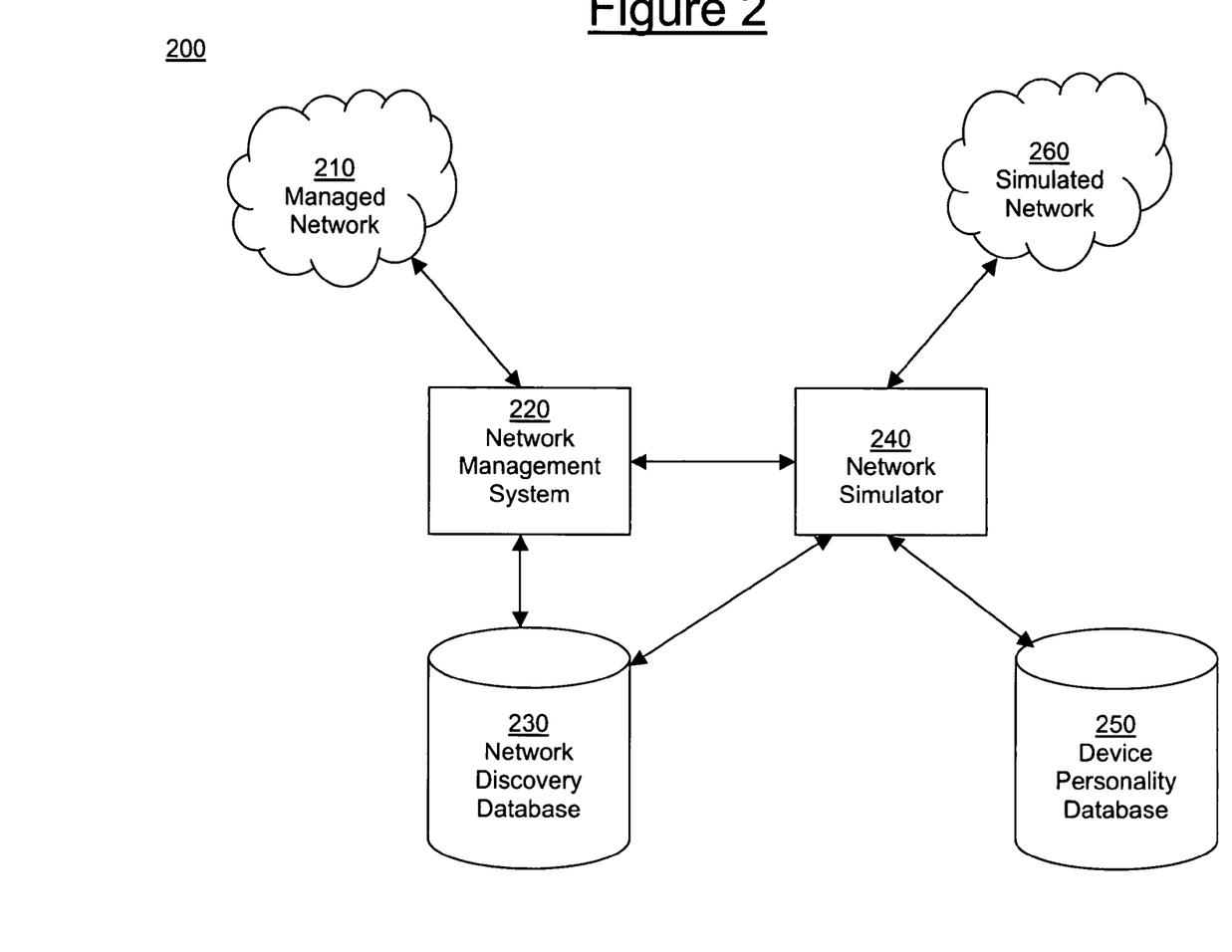
FIG. 2 is a block diagram of one embodiment of a system upon which the present invention may be practiced.

Referring now to FIG. 2, a block diagram of a system 200 upon which the present invention may be practiced is shown. As depicted in FIG. 2, system 200 includes managed network 210, network management system 220, network discovery database 230, network simulator 240, device personality database 250, and simulated network 260. In one embodiment, network simulator 240, in conjunction with network discovery database 230 and device personality database 250 is operable to perform a method for generating simulated network 260.

In one embodiment, network management system 220, network discovery database 230, network simulator 240, device personality database 250, and simulated network 260 are comprised within a single computer system (e.g., computer system 100 of FIG. 1). In another embodiment, network management system 220 is comprised within one computer system and network discovery database 230, network simulator 240, device personality database 250, and simulated network 260 are comprised within a second computer system. In another embodiment, network management system 220, network discovery database 230, network simulator 240, device personality database 250, and simulated network 260 are dispersed across a distributed computer network. In one embodiment, the components of system 200 communicate via the communications protocols of system 200. For example, network management system 250 may communicate with managed network 210 and network simulator 240 via simple network management protocol (SNMP).

Referring still to FIG. 2, in accordance with various embodiments, system 200 includes well-known network technologies. For example, system 200 can be implemented using LAN technologies (e.g., Ethernet), the Internet, or other wired or wireless network technologies. The communications links between managed network 210, network management system 220, network discovery database 230, network simulator 240, device personality database 250, and simulated network 260 can be implemented using, for example, a telephone circuit, communications cable, optical cable, wireless link, or the like.

In one embodiment, managed network 210 is an actual distributed computer network including a plurality of devices. In one embodiment, the devices include routers and switches. However, it should be appreciated that managed network 210 may include other devices for use in computer networking, such as hubs, or other computing devices, such as servers, computer systems, or voice over Internet protocol (VOIP) telephones.

Network management system 220 is coupled to managed network 210 for managing the configurations, security and health of managed network 210 while monitoring many other aspects including the performance of managed network 210. The network management system 220 is also coupled to network discovery database 230 for managed network 210. A network discovery database includes device information and connectivity information for devices of a managed network. In one embodiment, network management system 220 automatically compiles network discovery database 230 in accordance with monitoring managed network 210. In one embodiment, network discovery database 230 is referred to as an ani.db file.

In one embodiment, network simulator 240, which is coupled to network management system 220, network discovery database 230, device personality database 250 and simulated network 260, is a software application for testing network management system 220 by presenting simulated network 260 to network management system 220. In one embodiment, simulated network 260 is a build file that includes information regarding devices and connections of a network such that network management system 220 operates as if it were connected to an actual network. In one embodiment, network simulator 240 is operable to perform a method for generating simulated network 260 based on managed network 210 (e.g., process 300 of FIGS. 3A and 3B).

Device personality database 250, which is coupled to network simulator 240, stores the characteristics for a particular type of device. In one embodiment, device personality database 250 includes a plurality of personalities for different device types and operating systems. In one embodiment, a personality is defined by a system object identifier (often referred to as sysobjID), which includes, among many other attributes, a device type and an operating system name and version. For example, a particular type of router will have at least one personality for each operating system that can operate on the router. A personality includes static information describing a device, such as the device type, the device operating system version, and device interface information. The device interface information includes the number of ports for the device and the type of ports.

Figure 3A:
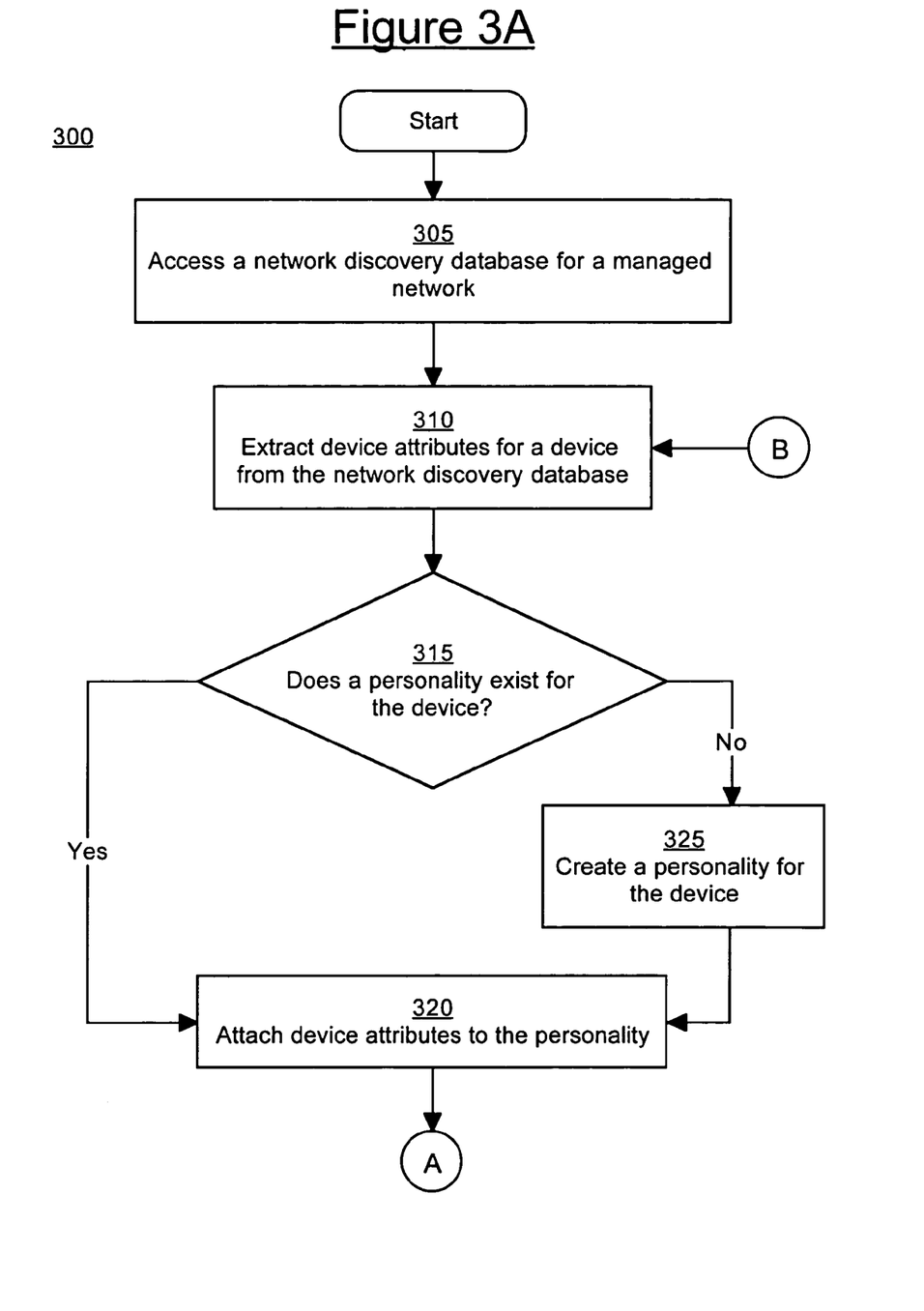
FIGS. 3A and 3B are a flow chart illustrating a method for generating a simulated network, in accordance with one embodiment of the present invention.
Figure 3B:
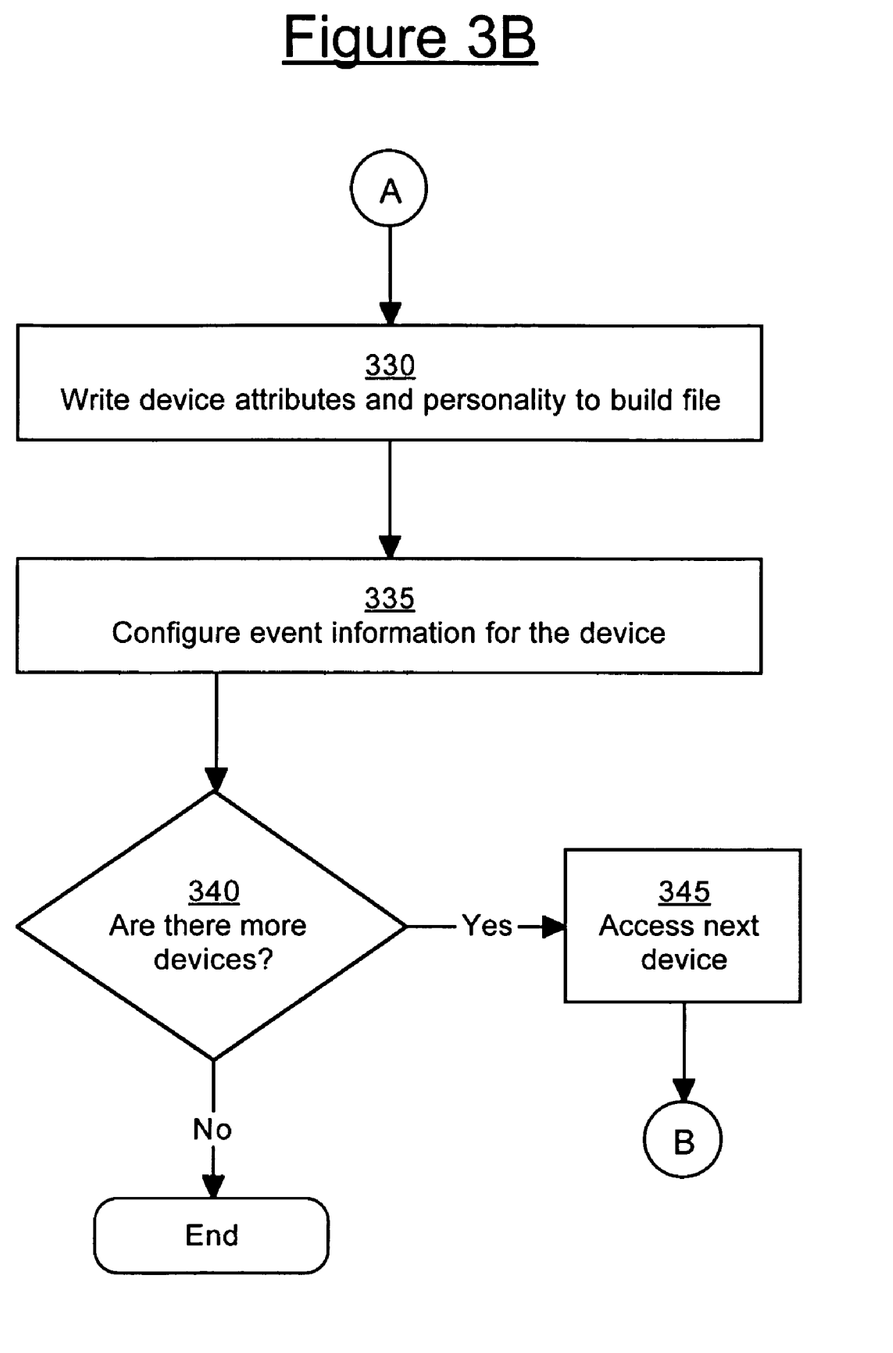

A Method for Generating a Simulated Network Based on an Actual Managed Network FIGS. 3A and 3B are a flow chart illustrating a process 300 for generating a simulated network based on a managed network, in accordance with one embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory (e.g., volatile memory 102 and non-volatile memory 103 of FIG. 1). However, the computer readable and computer executable instructions may reside in any type of computer readable medium. Although specific steps are disclosed in process 300, such steps are exemplary. That is, the embodiments of the present invention are well suited to performing various other steps or variations of the steps recited in FIGS. 3A and 3B. In one embodiment, process 300 is performed by network simulator 240 of FIG. 2.

With reference to FIG. 3A, at step 305 of process 300, a network discovery database (e.g., network discovery database 230 of FIG. 2) for a managed network is accessed, wherein the network discovery database includes device information and connectivity information for a plurality of devices of the managed network. In one embodiment, the network discovery database is automatically compiled by a network management system (e.g., network management system 220 of FIG. 2). In one embodiment, the plurality of devices includes routers and switches. However, it should be appreciated that other devices for use in computer networking, such as hubs, or other computing devices, such as servers, computer systems, or VOIP telephones.

At step 310, device attributes for a device are extracted from the network discovery database. In one embodiment, the device attributes include a Management Information Base (MIB) for the device. In one embodiment, the device attributes include a device type, network connectivity information, a device configuration, and a device operating system name and version. The device type identifies the type of device, such as a router, switch or other computing device. In one embodiment, the device type is identified by manufacturer model number. The network connectivity information describes the connections and interfaces of the device. In one embodiment, the network connectivity information is a neighbor discovery protocol (NDP) table. A NDP table includes connection information for the particular device, specifically the identification of all other devices connected to the device. In one embodiment, the NDP table is a Cisco discovery protocol (CDP) table. However, it should be appreciated that NDP table can be any information identifying neighboring devices. The device configuration identifies specific attributes for the particular device, such as line speeds and other configuration information. The device operating system identifies the operating system type and version, such as Cisco Internet Operating System (IOS) version 12.3.

In one embodiment, the device attributes also include event information, such as traps, system logs, and fault log for the device. A trap is a preconfigured rule that activates an alarm upon the occurrence of an event. A system log is a log on the device that logs information upon the occurrence of an event. A fault log includes reported faults of the device.

At step 315, it is determined whether a personality exists for the device. In one embodiment, the system object identifier of the device, which includes the device type and device operating system, is compared to personalities of a device personality database (e.g., device personality database 250 of FIG. 2). A personality describes the characteristics for a particular type of device running a particular operating system. For example, the personality includes device interface information, such as the number of ports for the device and the type of ports.

If it is determined that a personality for the device exists, process 300 proceeds to step 320, and the device attributes are attached to the personality. Attaching the device attributes to the personality provides a complete description of the device such that a network simulator (e.g., network simulator 240 of FIG. 2) can simulate the device.

Alternatively, if it is determined that a personality for the device does not exist, process 300 proceeds to step 325. At step 325, a personality is created for the device. In one embodiment, the personality is created by accessing the device personality database and selecting a personality that is closely related to the system object identifier of the device. In one embodiment, personalities with the closest model number are first selected. Next, the personality with the closest operating system is selected from the selected personalities. For example, if the device is a 3620 router running Cisco IOS version 11.2, and the closest model number is for a 3600 router, the personalities for the 3600 router are selected. The personality for the 3600 router running Cisco IOS version 11.2 is selected as the personality. Once a personality for the device is created, process 300 proceeds to step 320, where the device attributes are attached to the personality.

With reference to FIG. 3B, process 300 proceeds to step 330. At step 330, the device attributes and personality for the device are written to a build file. The build file includes all information necessary for a network simulator to simulate a network for a network management system. In other words, the build file includes information regarding devices and connections of a network such that a network management system operates as if it were connected to an actual network. In one embodiment, the build file is an ASCII file.

Figure 4A:
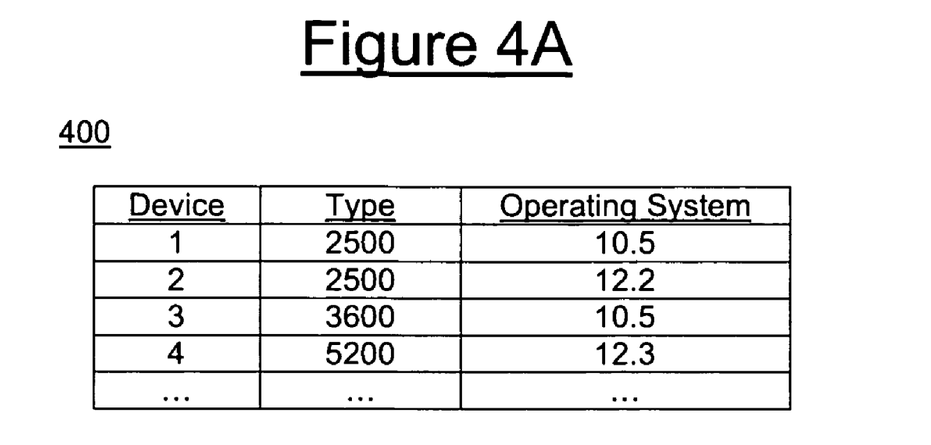
FIGS. 4A and 4B are tables of an exemplary build file, in accordance with one embodiment of the present invention.
Figure 4B:
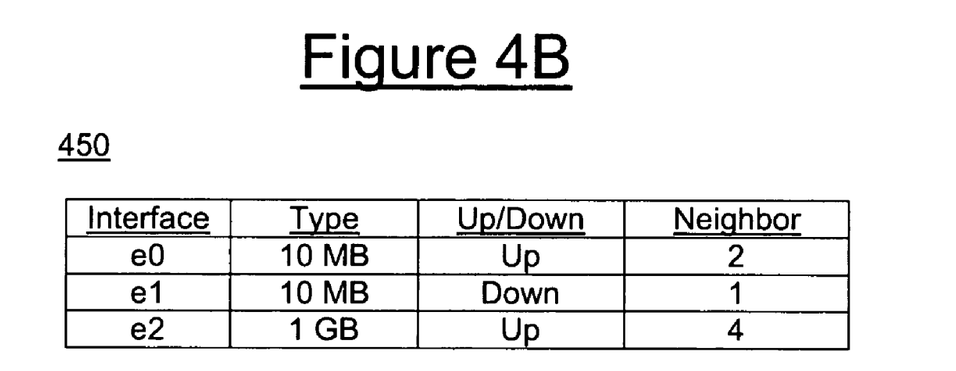

FIGS. 4A and 4B are tables 400 and 450 of an exemplary build file, in accordance with one embodiment of the present invention. Table 400 of FIG. 4A includes information describing the configuration of exemplary devices of a managed network. For example, device 1 is a 2500 router running on IOS operating system version 10.5. It should be appreciated that any information used for creating a simulated network may be included in table 400, and table 400 is not limited to the present embodiment. With reference to FIG. 4B, table 450 is an interface table for device 3 of FIG. 4A, including interface identification, connection type, current status (e.g., up or down) and the neighbor device. For example, interface 0 of device 3 is a 10 MB Ethernet connection, currently up, and is connected to device 2. It should be appreciated that each device described in table 400 has an associated interface table describing the neighbor connections for the device.

With reference to FIG. 3B, at step 335, the event information for the device is configured. In one embodiment, the traps, system logs, and fault logs for the device are configured. The build file is updated to include the event information. By including the event information, an accurate representation of an actual device of a managed network can be simulated, including all operational history of the device.

At step 340, it is determined whether there are any more devices within the network discovery database that have not been accessed. If there are more devices to access, process 300 accesses the next device, as shown at step 345. Process 300 then proceeds to step 310. Alternatively, if all devices of the network topology have been accessed, process 300 ends.

The described embodiments of the present invention provide a method for generating a simulated network based on a managed network. By accessing a network discovery database associated with the managed network, a simulated network is automatically created, thereby obviating the need for manually coding a simulated network. The simulated network may be used for testing the functionality, reliability, scalability, co-existence and performance of the network management system.

Various embodiments of the present invention, a method for generating a simulated network, are thus described. While the present invention has been described in particular embodiments, it should be appreciated that the present invention should not be construed as limited by such embodiments, but rather construed according to the below claims.

What is claimed is:

1. A method for generating a simulated network, the method comprising:
   monitoring an actual managed network to determine a device personality of an actual network device of the managed network;
   accessing a network discovery database comprising stored device personalities and associated device attributes for a plurality of device configurations;
   comparing the device personality with the stored device personalities;
   selecting one of the stored device configurations having a stored device personality that is the same as the device personality to determine the associated device attributes;
   attaching the associated device attributes to the device personality to create a new device configuration;
   automatically generating an updated build file for use by a network management simulator describing the simulated network based on the stored device configurations and the new device configuration; and
   storing the updated build file in a data storage device.

2. The method as recited in claim 1 further comprising writing the stored device configurations and the new device configuration to the build file, including the device personalities and the associated device attributes.

3. The method as recited in claim 1 wherein the stored device personality comprises: a device type and a device operating system version.

4. The method as recited in claim 3 wherein the device personality is compared with the stored device personality based on the device type and the device operating system version.

5. The method as recited in claim 3 wherein the device personality further includes device interface information comprising a number and type of ports.

6. The method as recited in claim 5 wherein the device interface information is determined according to a neighbor discovery protocol table for the device.

7. The method as recited in claim 1 further comprising:
   identifying one of the stored device configurations having a stored device personality that is a closest match to the device personality.

8. The method as recited in claim 7 wherein one of the stored device configurations is selected according to a comparison of a closest device model number.

9. The method as recited in claim 1 wherein the device attributes comprise line speeds and event information.

10. The method as recited in claim 9 wherein the event information comprises an operational history including traps, system logs and fault logs.

11. Software encoded in one or more computer-readable media and when executed by one or more processors operable to:
   monitor an actual managed network to determine a device personality;
   access a network discovery database comprising stored device personalities and associated device attributes for a plurality of device configurations;
   compare the device personality with the stored device personalities;
   select one of the stored device configurations having a stored device personality that is a closest match to the device personality to determine the associated device attributes;
   attach the associated device attributes to the device personality to create a new device configuration;
   automatically generate an updated build file for use by a network management simulator describing the simulated network based on the stored device configurations and the new device configuration; and
   process the build file to test a performance of the actual managed network.

12. The one or more computer-readable media as recited in claim 11 further operable to write the stored device configurations and the new device configuration to the build file, including the device personalities and the associated device attributes.

13. The one or more computer-readable media as recited in claim 11 wherein the device personality comprises: a device type and a device operating system version.

14. The one or more computer-readable media as recited in claim 13 wherein the device personality is compared with the stored device personality based on the device type and the device operating system version.

15. The one or more computer-readable media as recited in claim 13 wherein the device personality further includes device interface information comprising a number and type of ports.

16. The one or more computer-readable media as recited in claim 15 wherein the device interface information is determined according to a neighbor discovery protocol table for the device.

17. The one or more computer-readable media as recited in claim 11 further operable to:
   identify one of the stored device configurations having a stored device personality that is the same as the device personality.

18. The one or more computer-readable media as recited in claim 17 wherein one of the stored device configurations is selected according to a comparison of a closest device model number.

19. The one or more computer-readable media as recited in claim 11 wherein the device attributes comprise line speeds and event information.

20. The one or more computer-readable media as recited in claim 19 wherein the event information comprises an operational history including traps, system logs and fault logs.

21. A system for generating a simulated network, the system comprising:
means for monitoring an actual managed network to determine a device personality;
means for accessing a network discovery database comprising stored device personalities and associated device attributes for a plurality of device configurations;
means for comparing the device personality with the stored device personalities;
means for selecting one of the stored device configurations having a stored device personality that is the same as the device personality to determine the associated device attributes;
means for attaching the associated device attributes to the device personality to create a new device configuration;
means for automatically generating an updated build file for use by a network management simulator describing the simulated network based on the stored device configurations and the new device configuration.

22. The system as recited in claim 21 further comprising:
means for writing the stored device configurations and the new device configuration to the build file, including the device personalities and the associated device attributes.

23. The system as recited in claim 21 wherein the device personality comprises: a device type and a device operating system.

24. The system as recited in claim 23 wherein the device personality is compared with the stored device personality based on the device type and the device operating system.

25. The system as recited in claim 23 wherein the device personality further includes device interface information comprising a number and type of ports.

26. The system as recited in claim 25 wherein the device interface information is determined according to a neighbor discovery protocol table for the device.

27. The system as recited in claim 21 further comprising:
means for selecting one of the stored device configurations having a stored device personality that is a closest match to the device personality.

28. The system as recited in claim 27 wherein one of the stored device configurations is selected according to a comparison of a closest device model number.

29. The system as recited in claim 21 wherein the device attributes comprise line speeds and event information.

30. The system as recited in claim 29 wherein the event information comprises an operational history including traps, system logs and fault logs.

* * * * *

UNITED STATES PATENT AND TRADEMARK OFFICE
CERTIFICATE OF CORRECTION

| | |
|---|---|
| PATENT NO. | : 7,418,376 B1 |
| APPLICATION NO. | : 10/821289 |
| DATED | : August 26, 2008 |
| INVENTOR(S) | : Jeffrey B. Feldstein et al. |

Page 1 of 1

It is certified that error appears in the above-identified patent and that said Letters Patent is hereby corrected as shown below:

Col. 9, Line 18, In Claim 21, after "configuration;" insert -- and --.

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,418,376 B1 |
| APPLICATION NO. | : 10/821289 |
| DATED | : August 26, 2008 |
| INVENTOR(S) | : Jeffrey B. Feldstein et al. |

Page 1 of 1

It is certified that error appears in the above-identified patent and that said Letters Patent is hereby corrected as shown below:

Title Page, Item (73) Assignee:

Assignee Name should read as follows:

Cisco Technology, Inc.

Signed and Sealed this

Twenty-eighth Day of July, 2009

JOHN DOLL
*Acting Director of the United States Patent and Trademark Office*